(12) United States Patent
Spartano

(10) Patent No.: US 8,197,085 B2
(45) Date of Patent: Jun. 12, 2012

(54) PORTABLE LIGHTING DEVICE HAVING USER SELECTABLE LIGHT CONTROL

(75) Inventor: David A. Spartano, Brunswick, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 137 days.

(21) Appl. No.: 12/637,031

(22) Filed: Dec. 14, 2009

(65) Prior Publication Data

US 2010/0090612 A1 Apr. 15, 2010

Related U.S. Application Data

(63) Continuation of application No. PCT/US2008/007251, filed on Jun. 10, 2008.

(60) Provisional application No. 60/945,197, filed on Jun. 20, 2007.

(51) Int. Cl.
*F21L 4/04* (2006.01)

(52) U.S. Cl. ............... 362/205; 362/157; 315/209 R; 315/291

(58) Field of Classification Search ............. 362/205, 362/157, 270
See application file for complete search history.

(56) References Cited

U.S. PATENT DOCUMENTS

| 4,527,223 | A | 7/1985 | Maglica |
| 5,461,552 | A | 10/1995 | Tillery |
| 6,206,541 | B1 | 3/2001 | Landamia |
| 6,305,818 | B1 * | 10/2001 | Lebens et al. ............... 362/184 |
| 6,984,900 | B1 | 1/2006 | Bruwer |
| 7,220,016 | B2 * | 5/2007 | Matthews et al. ............ 362/205 |
| 7,510,294 | B2 * | 3/2009 | Steele et al. ................. 362/114 |
| 2003/0137834 | A1 * | 7/2003 | Jigamian et al. ............. 362/205 |
| 2004/0052076 | A1 * | 3/2004 | Mueller et al. .............. 362/293 |
| 2005/0122712 | A1 * | 6/2005 | Kim ............................. 362/184 |
| 2006/0163658 | A1 * | 7/2006 | Anderson et al. ............ 257/355 |
| 2009/0015420 | A1 | 1/2009 | Bruwer |

FOREIGN PATENT DOCUMENTS

JP 09-017202 A 1/1997

OTHER PUBLICATIONS

Patent Cooperation Treaty (PCT), International Search Report and Written Opinion for application No. PCT/US2008/007251, filed Jun. 10, 2008, mailed Feb. 10, 2008, Korean Patent Office, Korea.

* cited by examiner

*Primary Examiner* — Jacob Y Choi
*Assistant Examiner* — Anthony Arpin
(74) *Attorney, Agent, or Firm* — Michael C. Pophal

(57) ABSTRACT

A lighting device embodied as a flashlight is provided that includes a handheld housing and a light source provided on the housing for generating a light beam. The light device also includes a battery power source for providing power to the light source. The lighting device further includes light control circuitry for turning the light source on and off and controlling intensity of the light beam. The light control circuitry includes a user actuatable switch and a controller for controlling intensity of the generated light beam. The controller processes user activation of the switch and adjusts the intensity of the light beam as a function of the activation of the switch such that the light intensity may be increased or decreased.

17 Claims, 6 Drawing Sheets

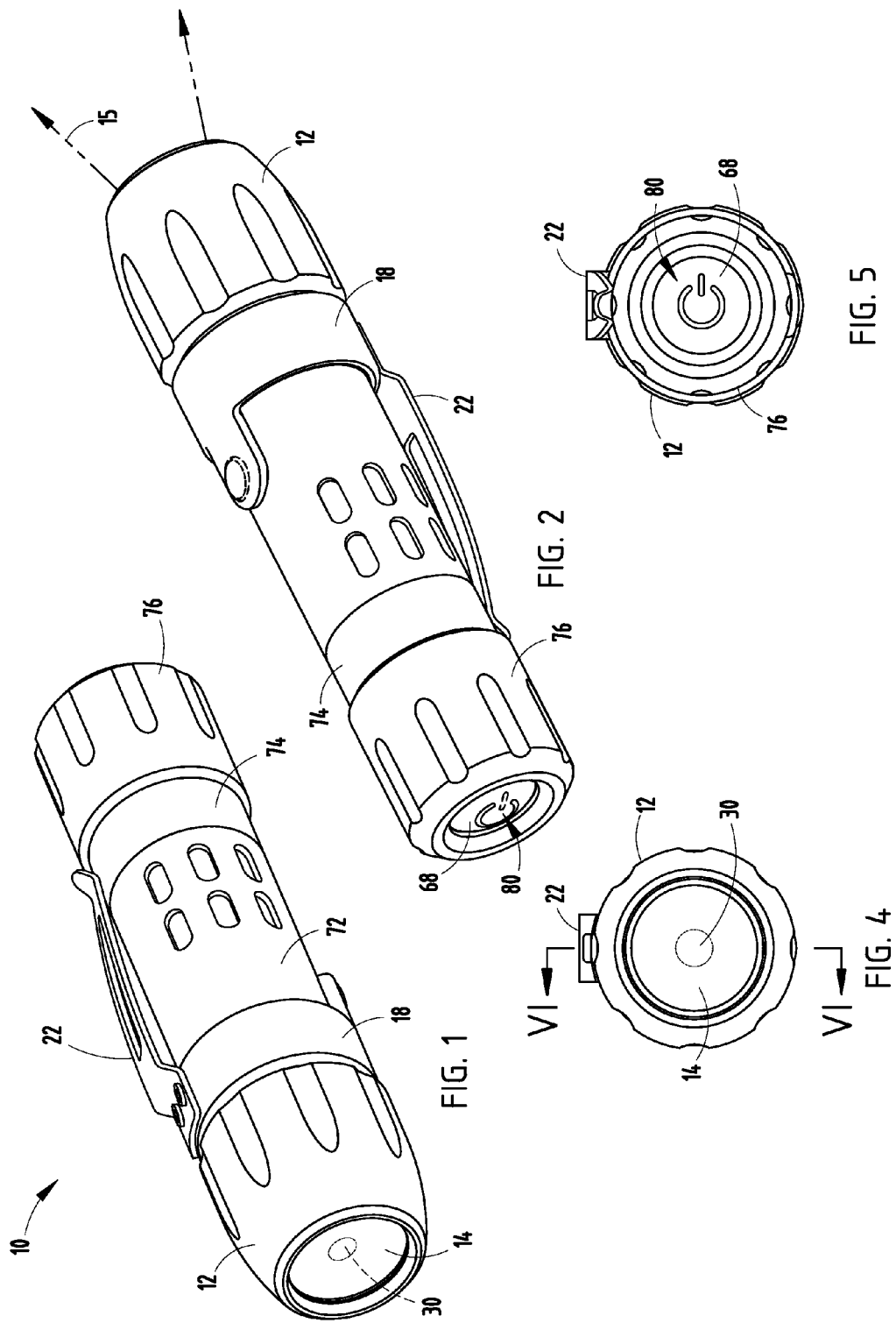

PORTABLE LIGHTING DEVICE HAVING USER SELECTABLE LIGHT CONTROL

CROSS-REFERENCE TO RELATED APPLICATION

This is a continuation of International application Ser. No. 08/007,251, filed Jun. 10, 2008, which claims the benefit to U.S. Provisional Patent Application No. 60/945,197, filed on Jun. 20, 2007, the entire disclosures of which are incorporated by reference.

BACKGROUND OF THE INVENTION

The present invention generally relates to lighting devices (e.g., flashlights) and, more particularly, to a portable lighting device that allows for user control of light illumination intensity.

Portable lighting devices, such as flashlights, generally employ a light source, such as an incandescent lamp or one or more light emitting diodes (LEDs), a reflector, a lens and a power source, such as one or more electrochemical cell batteries. The conventional flashlight further typically includes a user actuatable switch for activating the light source to turn the light source either on or off. In doing so, the switch generally closes a contact, which closes a current connection to provide battery power to the light source, or opens the contact to break the circuit connection to prohibit power supply to the light source.

In order to provide multiple selectable light illumination intensities, some conventional flashlights have employed multiple switch positions to turn on or off selected numbers of light emitting diodes (LEDs). However, multiple lamps are typically employed in such flashlights and usually a small number of select predetermined light illumination intensities are provided, typically without the ability to effectively select other light illumination intensities.

It would be desirable to have a portable lighting device that allows more flexibility in achieving a desired light illumination intensity.

SUMMARY OF THE INVENTION

In accordance with one aspect of the present invention, a lighting device is provided that provides a user selectable light illumination intensity. The lighting device includes a housing, a light source for generating a light beam, and a power source for providing power to the light source. The lighting device also includes light control circuitry for turning the light source on and off and controlling intensity of the light beam. The light control circuitry includes a switch and a controller for controlling intensity of the generated light beam. The controller processes a signal generated during activation of the switch and adjusts the intensity of the light beam as a function of activation of the switch.

According to another aspect of the present invention, a lighting device having user adjustable intensity control is provided. The lighting device comprises a housing, a light source for generating a light beam, and a battery compartment for receiving one or more batteries to power the light source. The lighting device also includes light control circuitry for turning the light source on and off and controlling intensity of the light beam. The light control circuitry comprises a user activated switch and a controller for controlling intensity of the generated light beam. The controller processes a signal generated during activation of the switch and adjusts intensity of the light beam as a function of activation of the switch by incrementally increasing and decreasing light illumination intensity as the switch is continuously activated.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1 is a front perspective view of a lighting device (flashlight) having control circuitry that controls light illumination intensity, according to one embodiment of the present invention;

FIG. 2 is a rear perspective view of the flashlight shown in FIG. 1;

FIG. 4 is a front view of the flashlight;

FIG. 5 is a rear view of the flashlight;

DETAILED DESCRIPTION OF THE PREFERRED EMBODIMENTS

Figure 3:
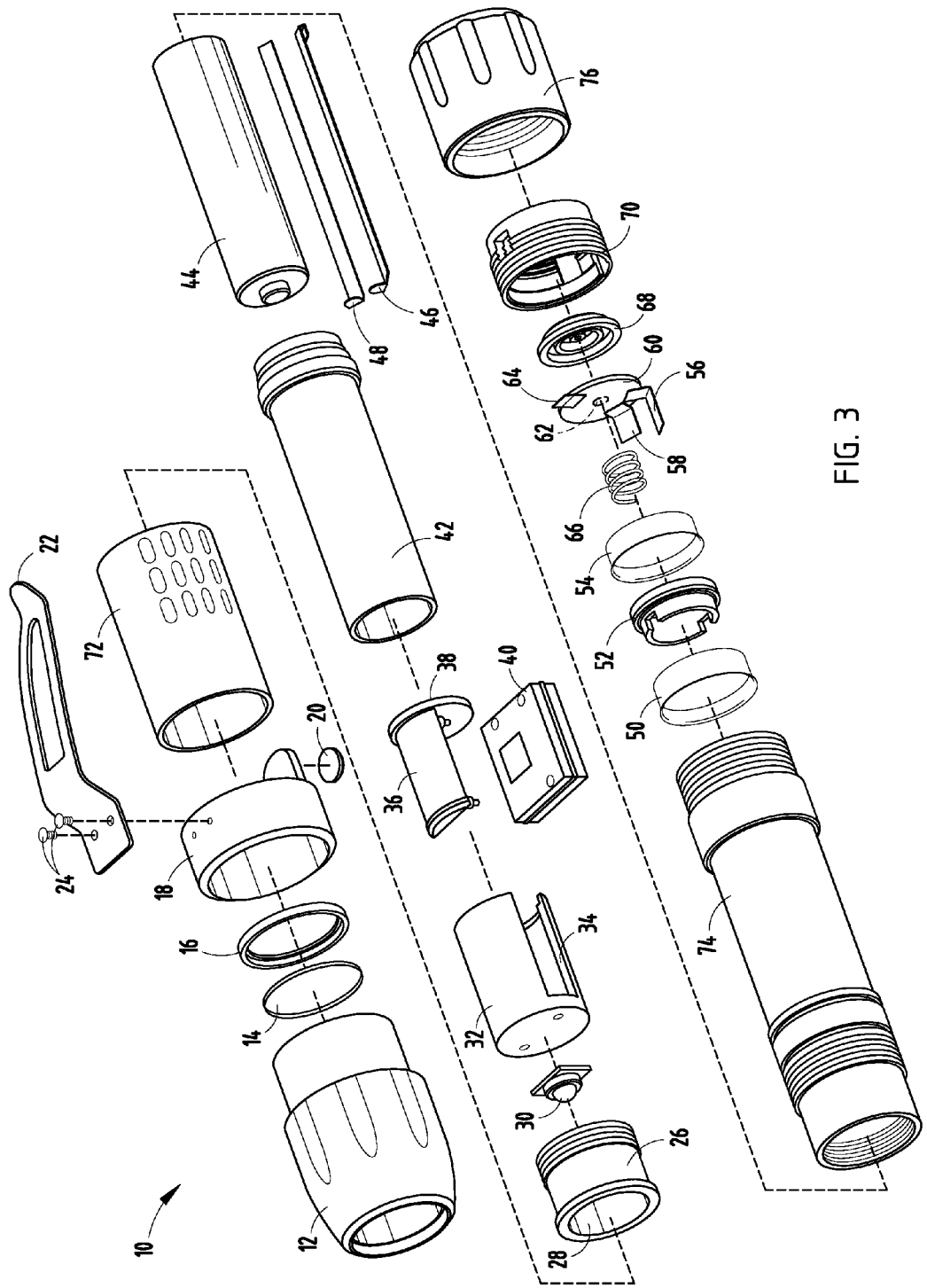
FIG. 3 is an exploded assembly view of the flashlight shown in FIG. 1.

Referring to FIGS. 1-6, a portable lighting device 10 is generally shown configured as a handheld flashlight having a light source 30 and light control circuitry 80 including a user selectable switch 62 and a controller 82 that activates the light source 30 and further adjusts intensity of light illumination in a light beam 15 generated by the light source 30, according to one embodiment of the present invention. The light source 30 and the control circuitry 80 are provided on a housing and arranged to produce the light beam 15 radiating forward of the lighting device 10. The control circuitry 80 has a user actuated push button switch 62 that advantageously allows a user to activate the light source 30 to turn it on and off and to further adjust the light illumination intensity of the light beam 15 in a manner that is easy to operate. While the lighting device 10 is generally shown and described herein as a portable handheld flashlight, it should be appreciated that the lighting device 10 may otherwise be configured as a headlamp or other lighting devices, according to other embodiments, to provide controlled intensity light illumination to a target area.

The housing of the portable lighting device 10 is made of multiple components assembled to include a handle. The light source 30 is located at the front end of the housing and the manually actuated switch 62 shown as a push button switch is located at the opposite rear end of the housing at the rear end of the handle. The switch 62 is utilized for activating energization (i.e., on or off) of the lighting device 10 and for further controlling intensity of the resulting light beam 15.

Disposed within a battery compartment located in the handle of the housing are one or more energy storage batteries 44 (e.g., lithium battery) which serve as the electrical power source. The one or more energy storage batteries are electrically coupled to the light source 30, such as a high intensity light emitting diode (LED), via electrical circuitry (e.g., electrical contacts). The power source may include any of a number of one or more electrical storage batteries. According to the disclosed embodiment, the power source 44 has a single AA-size lithium electrochemical cell battery. The use of one or more lithium batteries generally offers higher current and power capability as compared to alkaline cells. It should further be appreciated that while one or more batteries are shown and described herein as the power source, the power source 44 may employ another electrical power source, including an alternating current (AC) or direct current (DC) power source, according other embodiments.

The lighting device 10 is shown including a generally cylindrical lens ring 12 at the front end of the housing. The lens ring 12 may be made of machined aluminum, according to one embodiment. An optical light transmissive lens 14 and lens gasket 16 are disposed within the lens ring 12. The optical lens 14 may include a magnifier lens, such as a plano convex or double convex lens, to magnify and focus the light beam 15 into a desired shape and size. A generally cylindrical logo ring 18 engages a reduced diameter rear portion of lens ring 12. In one embodiment, the logo ring 18 is made of aluminum and includes a logo jewel 20 which provides a desired aesthetic appearance.

Assembled within the lens ring 20 and behind the lens 14 is a reflector 26 having a reflective inside surface 28. Disposed near the rear end of the reflector 26 is the light source 30, shown in the form of a light emitting diode (LED). One example of a suitable LED 30 may include Model No. XRE, commercially available from Cree, Inc. The LED 30 is shown mounted on a substrate, which enables a pair of electrical lead wires to be soldered to the LED 30. The LED 30 generates light that generally is emitted forward and passes through lens 14. Some light generated by LED 30 may reflect off of the reflective surface 28 of reflector 26 and then pass through lens 14. As a result, substantially all of the light illumination generated by the LED 30 passes through lens 14 and is emitted in the light beam 15.

The LED 30 is shown assembled to the front end of a heat sink 32 which may be made of aluminum or other thermally conductive material. The heat sink 32 dissipates heat (thermal energy) generated by the LED 30 away from the LED 30 so as to cool the LED 30. The heat sink 32 is generally cylindrical and has a slot 34 extending longitudinally along one side for receiving a printed circuit board 40. The printed circuit board 40 fits within slot 34 and includes assembled circuit components as described herein. The printed circuit board 40 further engages a polymeric printed circuit board (PCB) support 36. One end of PCB support 36 has a disk-shaped board 30 with openings that allow for electrical contacts to be made with the printed circuit board 40.

The housing further includes a generally cylindrical elongated handle body 74, which is made of aluminum. Handle body 74 has threads formed on an outside surface near the front end to threadingly engage slots within lens ring 12. The elongated handle body 74 also has threads formed on the inside surface near the front end to threadingly engage the reflector 26. The handle body 74 substantially houses the LED 30, heat sink 32, printed circuit board 40 and battery 44. The handle body 74 is in electrical contact with conductive tab 64 and thereby also serves as an electrical conduction path for the neutral voltage potential. An outer rubber sleeve 72 slides onto the outer surface and covers a portion of the aluminum handle body 74 to provide enhanced finger gripping for the handle.

Disposed within the aluminum handle body 74 is a cylindrical insulating sleeve 42 in the shape of a tube that serves as the battery compartment for receiving the battery 44 as the power source. In the embodiment shown, a single lithium battery 44 serves as the power source to power the LED 30 and other electrical circuitry. It should be appreciated that the battery 44 has a positive contact terminal and a negative contact terminal that provide a voltage potential (e.g., 1.5 volts) to power the LED 30 and other circuitry as should be evident to those skilled in the art. In the embodiment shown, the negative contact terminal of the battery 44 engages a spring 66 that biases the battery 44 so that the positive and negative contact terminals are held in physical contact with contacts to provide good electrical connections. The spring 66 abuts a switch printed circuit board 60. Opposite the spring 66 on printed circuit board 60 is a switch, shown and described as a microswitch 62, which forms the user selectable contact switch. The switch 62 is aligned with an overlying switch boot 68 that is actuatable by a user at the rear end of the lighting device 10 such that depressing the boot 68 actuates the contact switch 62 to the closed position. The switch 62 is retained within a switch contact housing 70 and held in place by a threadingly engaged switch PCB retainer 52.

The switch 62 is essentially disposed within the switch contact housing 70 which, in turn, is threadingly engaged to the ring-shaped end cap 76. The switch contact housing 70 is also threadingly engaged to the switch PCB retainer 52. The switch 62 is depressible by a user pressing on the switch boot 68 to close a contact to provide an electric current path via conductive tabs 56 and 58. Tabs 56 and 58, in turn, are in electrical contact with contact strips 46 and 48, respectively. Contact strips 46 and 48 extend longitudinally through the handle body 74 outside of insulating sleeve 42 and extend around the outside of battery 44. Contact strips 46 and 48 make electrical contact with contact pads on the printed circuit board support 38, which, in turn, provides electrical connection to circuitry on the printed circuit board 40. Thus, electrical circuit connections are provided between the printed circuit board 40 and the switch 62 to supply the switch generated signal to control circuitry for processing.

When a user depresses the switch 62, a signal is provided to the printed circuit board 40 indicating that the switch is closed. It should be appreciated that the connection between the contact tabs 56 and 58 and the contact strips 46 and 48 may be provided by way of first and second ring-shaped contact strip collars 50 and 54. In the embodiment shown, a first signal may be transmitted on the first contact strip 46 and a second signal transmitted on the second contact strip 48 when the switch 62 is closed. The first signal may be used to activate or wakeup control circuitry and to provide electrical power to the control circuitry to control the light source 30. The second signal may be used to provide electrical power to the light source 30 to turn the light source 30 on. It should be appreciated that other circuit configurations may be employed to provide the switch generated signal to the light source 30 and control circuitry.

In addition, the lighting device 10 is further shown including a clip 22, such as a belt clip, fastened onto the logo ring 18 via a pair of fasteners 24. The clip 22 enables the lighting device 10 to be attached to and held in place relative to a supporting member.

Figure 6:
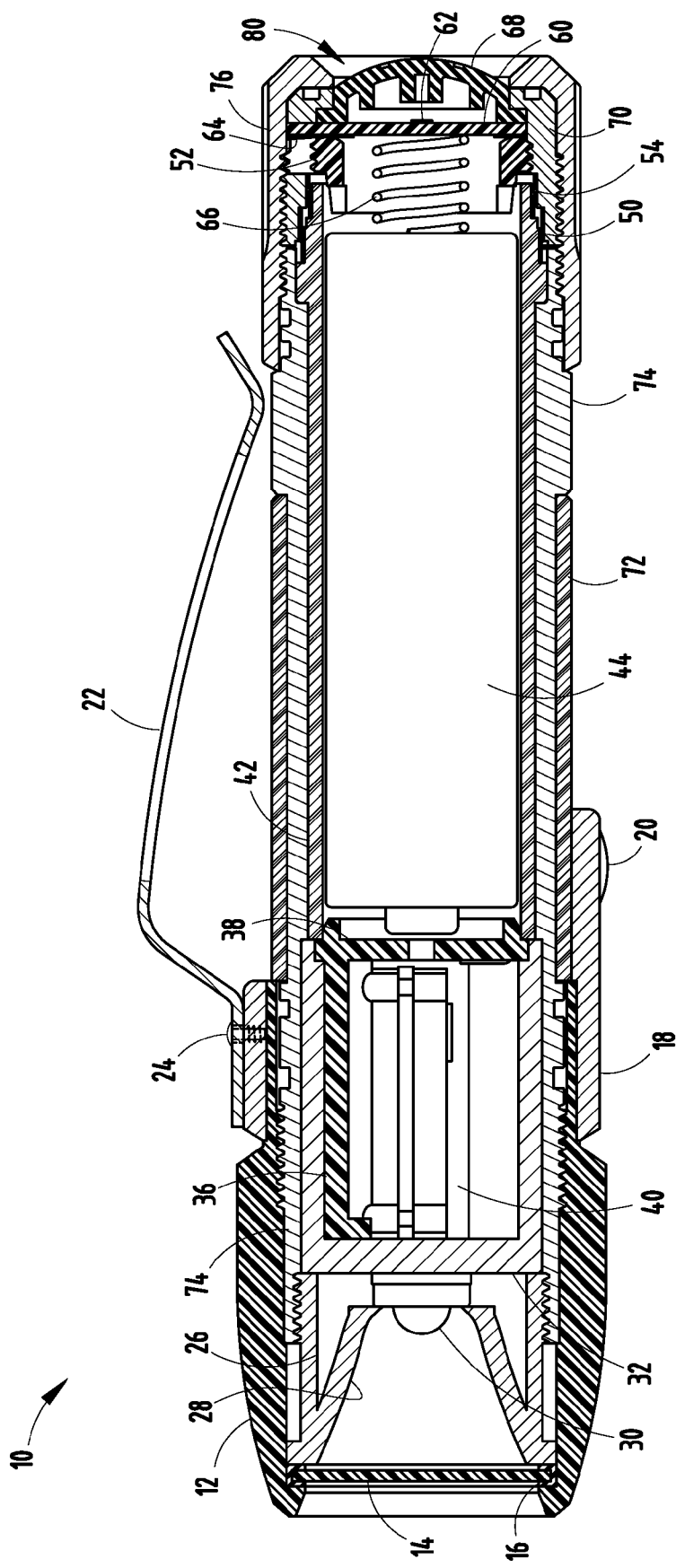
FIG. 6 is a cross-sectional view of the flashlight taken through line VI-VI of FIG. 4.

As seen in FIG. 6, the light control circuitry 80 includes the user actuated contact switch 62 engagable by depressing switch boot 68 to close a circuit connector (contact) for purposes of turning the light on or off and, when held for a sufficient time period, for further changing the intensity of the light beam 15. When the contact switch 62 is depressed, a signal is sent to control circuitry on the printed circuit board 40 which processes the microswitch generated signal. According to one embodiment, the printed circuit board 40 includes control circuitry having a microcontroller 82, a voltage multiplier circuit 92, and boost circuit 90. The microcontroller 82 monitors the signal generated by the switch 62 and turns the light on and off based on the signal. The microcontroller 82 also monitors the time that the microswitch 62 is depressed to the closed contact position and, based on the time of the user actuation of switch 62, controls the intensity of the light beam 15 to increase and decrease the light illumination intensity. The microcontroller 82 includes logic that controls the intensity of the light beam 15 by adjusting the duty cycle of a pulse width modulated (PWM) signal, according to one embodiment. With the switch 62 continuously depressed, the duty cycle of the PWM signal supplied to the light source 30 is continuously increased and decreased to incrementally increase and decrease the light illumination intensity in a repeated ramp cycle, until the user no longer depresses switch 62. When the light source 30 approaches the maximum light illumination intensity, the LED 30 flashes and then begins to decrease in intensity. When the light source 30 approaches the minimum light illumination intensity, the LED 30 flashes and then begins to increase in intensity. Thus, the light illumination intensity of the LED 30 cycles up and down repeatedly as the user continuously holds down the switch 62 in the closed position.

Figure 7:
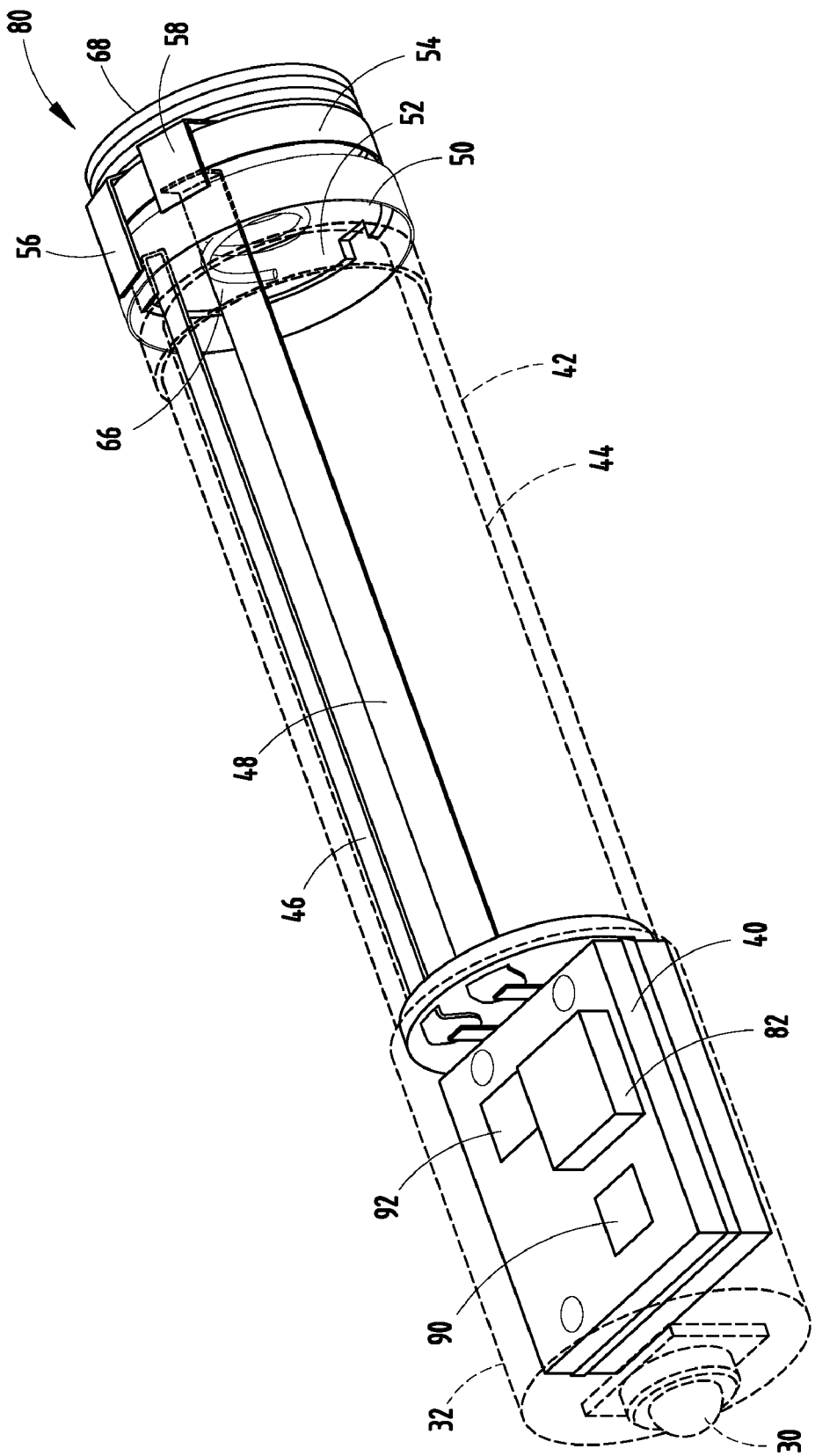
FIG. 7 is a partial assembly view of the electrical connections of the light control circuitry employed in the flashlight.

Referring to FIG. 7, the light control circuitry 80 is illustrated removed from the housing showing electrical signal paths provided via contacts 46 and 48 between the user selectable switch 62 and the control circuitry provided on the printed circuit board 40. The printed circuit board 40 may include various electrical control circuits including the microcontroller 82, voltage multiplier circuit 92, and boost circuit 90 in electrical contact with the LED 30 to control activation and intensity of the LED 30.

Figure 8:
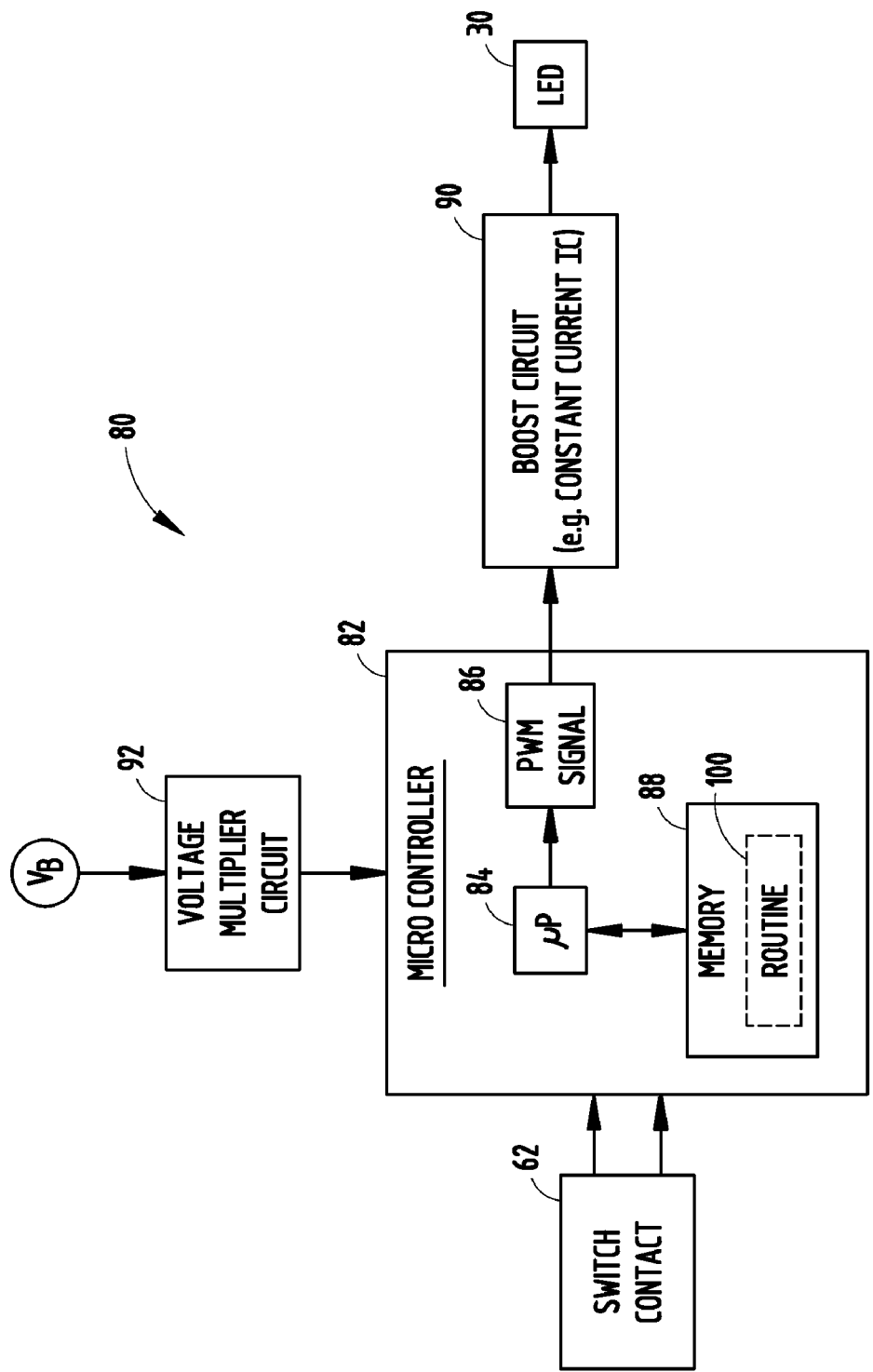
FIG. 8 is a block diagram illustrating the light control circuitry provided on the printed circuit board.

According to one embodiment, the control circuitry 80 includes the microcontroller 82, voltage multiplier circuit 92, and boost circuit 90 as further shown in FIG. 8. The microcontroller 82 may employ a microprocessor 84 and memory 88 as should be evident to those skilled in the art. In one embodiment, the microprocessor 84 executes a routine 100 stored in memory 88 to process the switch generated signal and control activation and light illumination intensity of the LED 30 with a pulse width modulation signal 86. The pulse width modulation signal 86 is supplied as an input to power the LED 30 and has a duty cycle that is controlled to change the intensity of the light beam. To increase intensity of the light beam, the duty cycle of the PWM signal is increased, whereas to decrease intensity of the light beam, the duty cycle of the PWM signal is decreased. According to one embodiment, the microprocessor 84 employs an 8-bit PIC 1650 having 256 output states to set the duty cycle of the pulse width modulated signal. Accordingly, in this embodiment, the pulse width modulated signal may be adjusted incrementally in $1/256^{th}$ increments. At the maximum beam intensity, the power supplied to the LED is continuous, with no duty cycle. At the minimum beam intensity, the duty cycle is set at 12.5%, according to one example. It should be appreciated that the beam intensity is incrementally adjusted based on at least eight increments between the maximum and minimum beam intensities.

The voltage multiplier circuit 92 receives the battery voltage supplied by the battery 44 and multiplies the voltage by a multiplication factor. According to one embodiment, employing a single 1.5 volt battery, the voltage multiplier circuit 92 may be configured with a multiplication factor of two to double the battery voltage of 1.5 volts to supply a voltage of 3.0 volts to the microcontroller 82. In this embodiment, given a single battery having a voltage of 1.5 volts, the doubling of the voltage to 3.0 volts advantageously allows for sufficient voltage to power the microcontroller 82 and the light source 30. It should be appreciated that other multiplication factors may be employed, and that the voltage multiplier circuit 92 is an optional component that need not be required.

The boost circuit 90 receives the pulse width modulated signal 86 and provides any needed boost to the amplitude of the signal supplied as an input to power the LED 30. According to one embodiment, the boost circuit 90 may be implemented as a constant current integrated circuit (IC) that outputs a constant current to the LED 30. It should be appreciated that the circuit configurations for the voltage multiplier circuit 92 and the boost circuit 90, such as a constant current IC, should be readily known to those in the art.

According to another embodiment, the controller 82 may include an application specific integrated circuit (ASIC). It should be appreciated that other control circuitry may be arranged to execute a routine that processes the user actuation of the switch 62 to perform the function to control the activation of the light source 30 and adjust the intensity of the resulting light beam, without departing from the teachings of the present invention.

Figure 9:
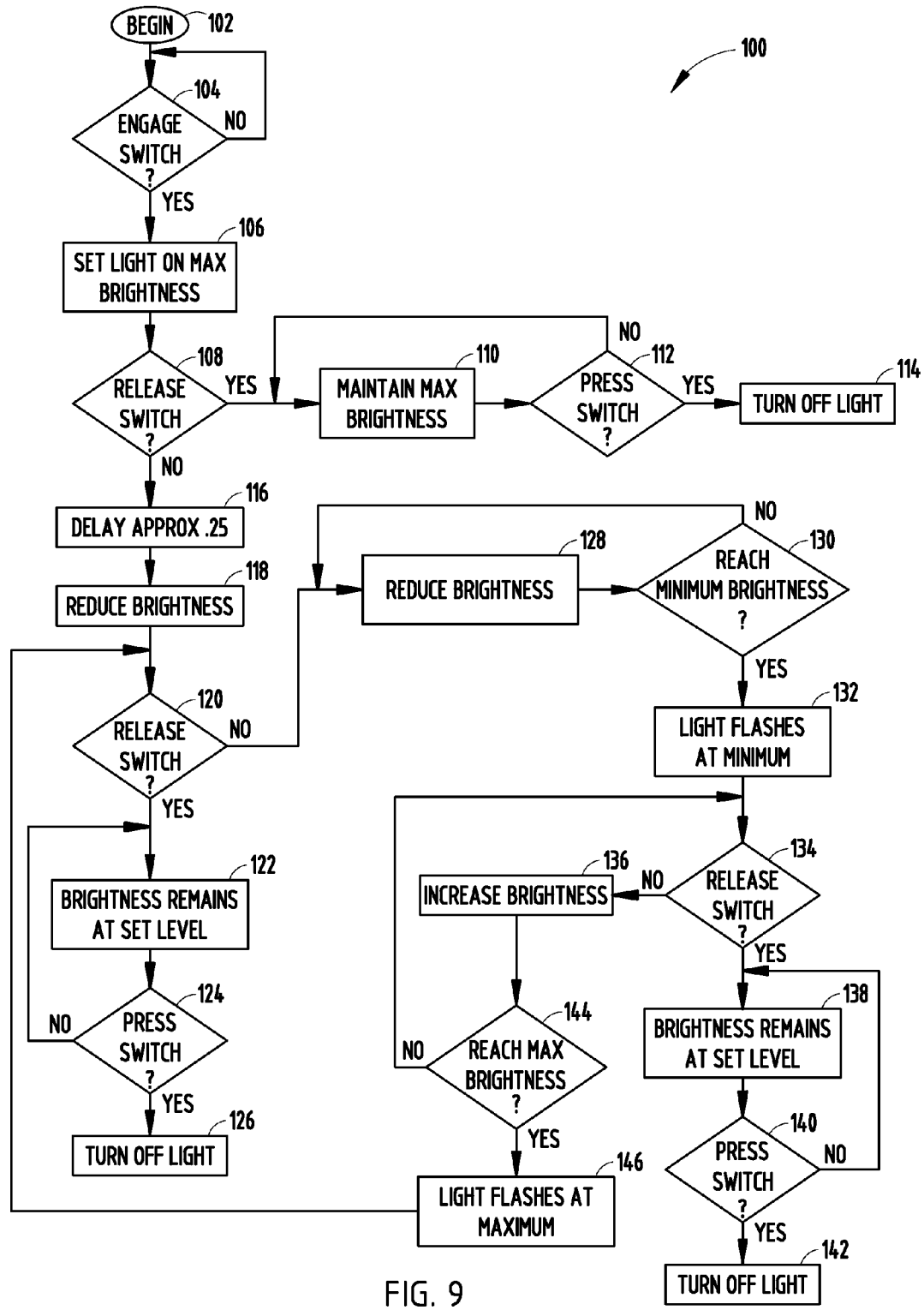
FIG. 9 is a flow diagram illustrating a routine for controlling light illumination intensity with the light control circuitry according to one embodiment of the present invention.

Referring to FIG. 9, the light control routine 100 is illustrated, according to one embodiment, which may be implemented as software executed by a controller, specifically a microprocessor. The light control routine 100 begins at step 102, proceeds to step 104 and, if the user selectable switch is engaged such that the electrical switch contact is closed, then proceeds to step 106 to set the light source on the maximum brightness (intensity). Next, method 100 proceeds to determine if the switch has been released such that the contact is open in decision step 108 and, if so, maintains the maximum brightness setting of the light source. Thereafter, in decision step 112, method 100 determines whether the switch has been pressed and, if so, turns the light source off in step 114. When the light source is turned off, method 100 may enter a sleep mode in which no or very little power consumption is required by the control circuitry. If the switch has not been pressed, the maximum brightness of the light source is maintained.

If the switch has not been released as determined in step 108, method 100 proceeds to wait for a time delay of approximately 0.25 seconds in step 116, which provides a sufficient time to distinguish between an initial switch depression to turn the light on and off, and further desire to adjust brightness of the light source. Following the 0.25 second time delay, method 100 proceeds to decision step 120 to determine whether the switch has been released. If the switch is released, method 100 no longer reduces the brightness and maintains the brightness at the set level in step 122. With the brightness set at the set level, method 100 monitors the switch to determine if the switch has been depressed in decision step 124, and, if so, turns the light off in step 126. Otherwise, the brightness remains at the set level.

The light source will continue to be incrementally decreased in brightness in step 118 with the switch continuously depressed, until a minimum brightness is reached. The reduction in brightness of the light source may include an incremental decrease in brightness of the light source by changing the duty cycle of the pulse width modulated signal, according to one embodiment. If decision step 120 determines that the switch has been released, method 100 proceeds to step 128 to continue to reduce the brightness. In decision step 130, method 100 determines whether the minimum brightness has been reached, and, if not, continues to reduce the brightness of the light source. If the minimum brightness has been reached, method 100 proceeds to step 132 to cause the light source to flash at the minimum brightness, thus providing the user with an indication that the minimum brightness level has been reached.

Once the minimum brightness has been reached and the light flashes at step 132, the light intensity begins to ramp up to increase the brightness as long as the switch remains depressed. In decision step 134, method 100 will monitor whether the switch has been released or not. If the switch has not been released, the brightness continues to increase in step 136 until either the switch is released or the maximum brightness level is reached. At decision step 144, routine 100 determines if the maximum brightness has been reached and, if not, returns to step 134 to determine if the switch has been released. If the switch is released, the brightness level remains at the set level in step 138. Thereafter, method 100 proceeds to monitor whether the switch has been depressed in step 140, and, if so, turns the light off in step 142.

If the switch has not been released and the brightness is increasing and in decision step 144 it is determined that the maximum brightness has been reached, then routine 100 flashes the light source at the maximum brightness in step 146. It should be appreciated that the light source is flashed at both maximum and minimum brightness levels to provide a user with an indication of reaching the extreme illumination intensity settings. The flash may be achieved by turning the light source off and on one or more times. Following flash of the light source in step 146, routine 100 returns to step 120 to determine if the switch has been released and, if not, starts to repeat step 128 to reduce brightness of the light source. Accordingly, the light illumination intensity repeatedly cycles up and down when the switch is continuously held in the closed position.

According to various aspects of the present invention, provided is a lighting device comprising a housing, a light source for generating a light beam, a power source for providing power to the light source, and light control circuitry for turning the light source on and off and controlling intensity of the light beam. The light control circuitry comprises a switch and a controller for controlling intensity of the generated light beam. The controller processes a signal generated during activation of the switch and adjusts the intensity of the light beam as a function of activation of the switch. According to further aspects of the invention, the controller adjusts intensity of the light beam as a function of the amount of time that the switch is activated, and incrementally increases and decreases the light illumination intensity as the switch is continuously activated. The controller provides a pulse width modulated signal to the light source and adjusts a duty cycle of the pulse width modulated signal to adjust intensity of the light beam. The lighting device is a handheld flashlight and the housing comprises a handle adapted to be held by a user. The light control circuitry cyclically increases and decreases the intensity of the light beam when the switch is activated. The light control circuitry comprises a boost circuit coupled between the controller and the light source, and the boost circuit comprises a constant current integrated circuit. The light control circuitry comprises a voltage multiplier circuit coupled to the power source for multiplying the voltage of the power source supplied to the controller. The light source comprises a light emitting diode. The switch is a user actuatable switch. The power source comprises one or more batteries.

According to further aspects of the present invention, a lighting device is provided that has user adjustable intensity control. The lighting device comprises a housing, a light source for generating a light beam, and a battery compartment for receiving one or more batteries to power the light source. The lighting device also includes light control circuitry for turning the light source on and off and controlling intensity of the light beam. The light control circuitry comprises a user activated switch and a controller for controlling intensity of the generated light beam. The controller processes a signal generated during activation of the switch and adjusts intensity of the light beam as a function of activation of the switch by incrementally increasing and decreasing light illumination intensity as the switch is continuously activated. According to various other aspects of the invention, the controller adjusts intensity of the light beam as a function of the amount of time that the switch is activated. The controller provides a pulse width modulated signal to the light source and adjusts a duty cycle of the pulse width modulated signal to adjust intensity of the light beam. The lighting device is a handheld flashlight and the housing comprises a handle adapted to be held by a user. The light control circuitry cyclically increases and decreases the intensity of the light beam when the switch is activated. The light control circuitry further comprises a boost circuit coupled between the controller and the light source, and the boost circuit comprises a constant current integrated circuit. The light control circuitry comprises a voltage multiplier circuit coupled to the power source for multiplying the voltage of the power source supplied to the controller. The light source comprises a light emitting diode.

Accordingly, the light control circuitry 80 including routine 100 advantageously allows for a user to control the lighting device 10 by activating a single switch 62 to turn the light on and off and to further adjust the intensity of the light illumination. By simply depressing the switch 62, the control circuitry 80 is able to cyclically increase and decrease the light illumination intensity, thus offering the user the ability to select the desired intensity level of the light beam.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. A lighting device comprising:
   a housing;
   a light source for generating a light beam;
   a power source for providing power to the light source; and
   light control circuitry for turning the light source on and off and controlling intensity of the light beam, wherein the light control circuitry comprises a switch and a controller for controlling intensity of the generated light beam, wherein the light control circuitry processes a signal generated during activation of the switch and adjusts the intensity of the light beam as a function of activation of the switch such that the intensity of the light beam generated by the light source is incrementally increased and decreased in a repeated ramp cycle between a maximum beam intensity and a minimum beam intensity while the switch is continuously activated, wherein the light control circuitry adjusts intensity of the light beam as a function of the amount of time that the switch is activated, and wherein the light control circuitry further controls the light source to generate a flashing light beam when the light beam is at one of the maximum and minimum beam intensities.

2. The lighting device as defined in claim 1, wherein the light control circuitry provides a pulse width modulated signal to the light source and adjusts a duty cycle of the pulse width modulated signal to adjust intensity of the light beam.

3. The lighting device as defined in claim 1, wherein the lighting device is a handheld flashlight and the housing comprises a handle adapted to be held by a user.

4. The lighting device as defined in claim 1, wherein the light control circuitry further comprises a boost circuit coupled between the controller and the light source.

5. The lighting device as defined in claim 4, wherein the boost circuit comprises a constant current integrated circuit.

6. The lighting device as defined in claim 1, wherein the light control circuitry comprises a voltage multiplier circuit coupled to the power source for multiplying the voltage of the power source supplied to the controller.

7. The lighting device as defined in claim 1, wherein the light source comprises a light emitting diode.

8. The lighting device as defined in claim 1, wherein the switch is a user actuatable switch.

9. The lighting device as defined in claim 1, wherein the power source comprises one or more batteries.

10. The lighting device as defined in claim 1, wherein the light control circuitry causes the light source to generate a flashing light beam at each of the maximum and minimum beam intensities.

11. A lighting device having user adjustable intensity control, said lighting device comprising:
   a housing;
   a light source for generating a light beam;
   a battery compartment for receiving one or more batteries to power the light source; and
   light control circuitry for turning the light source on and off and controlling intensity of the light beam, wherein the light control circuitry comprises a user activated switch and a controller for controlling intensity of the generated light beam, wherein the light control circuitry processes a signal generated during activation of the switch and adjusts intensity of the light beam as a function of activation of the switch by incrementally increasing and decreasing light illumination intensity in a repeated ramp cycle between a maximum beam intensity and a minimum beam intensity as the switch is continuously activated, and wherein the light control circuitry further causes the light source to generate a flashing light beam at each of the maximum and minimum beam intensities.

12. The lighting device as defined in claim 11, wherein the light control circuitry adjusts intensity of the light beam as a function of the amount of time that the switch is activated.

13. The lighting device as defined in claim 11, wherein the light control circuitry provides a pulse width modulated signal to the light source and adjusts a duty cycle of the pulse width modulated signal to adjust intensity of the light beam.

14. The lighting device as defined in claim 11, wherein the lighting device is a handheld flashlight and the housing comprises a handle adapted to be held by a user.

15. The lighting device as defined in claim 11, wherein the light control circuitry further comprises a boost circuit coupled between the controller and the light source.

16. The lighting device as defined in claim 15, wherein the boost circuit comprises a constant current integrated circuit.

17. The lighting device as defined in claim 11, wherein the light source comprises a light emitting diode.

\* \* \* \* \*